(12) United States Patent
Azcuenaga et al.

(10) Patent No.: US 9,546,002 B1
(45) Date of Patent: Jan. 17, 2017

(54) VIRTUAL INSTRUMENT VERIFICATION TOOL

(71) Applicant: The Boeing Company, Chicago, IL (US)

(72) Inventors: Brian Azcuenaga, Castle Rock, CO (US); Samantha A. Schwartz, Castle Pines, CO (US); Jason W. Clark, Evergreen, CO (US); Matthew B. Hendrian, Aurora, CO (US); Willard K. Otto, Aurora, CO (US)

(73) Assignee: The Boeing Company, Chicago, IL (US)

( * ) Notice: Subject to any disclaimer, the term of this patent is extended or adjusted under 35 U.S.C. 154(b) by 645 days.

(21) Appl. No.: 14/041,368

(22) Filed: Sep. 30, 2013

(51) Int. Cl.
*G06K 9/62* (2006.01)
*B64D 43/00* (2006.01)
*B64D 47/08* (2006.01)

(52) U.S. Cl.
CPC ............... *B64D 43/00* (2013.01); *B64D 47/08* (2013.01)

(58) Field of Classification Search
CPC ............ G06K 9/00; B64F 5/00; B64F 5/0045; G07C 5/08; G06F 17/30047
See application file for complete search history.

(56) References Cited

U.S. PATENT DOCUMENTS

| | | | | |
|---|---|---|---|---|
| 8,779,944 B2* | 7/2014 | Weinmann | ............. | B64D 45/00 340/438 |
| 8,892,273 B1* | 11/2014 | Raghu | ..................... | B64D 43/00 235/462.01 |
| 8,958,945 B2* | 2/2015 | Ovens | ....................... | B64F 5/00 701/14 |
| 9,019,128 B1* | 4/2015 | Kim | ....................... | G01C 23/00 340/945 |
| 9,195,375 B2* | 11/2015 | Deleris | ................. | G06F 3/0484 |
| 9,202,098 B2* | 12/2015 | Lewis | ...................... | G01D 3/08 |
| 2007/0236366 A1* | 10/2007 | Gur | .......................... | G06K 9/00 340/945 |
| 2012/0075122 A1* | 3/2012 | Whitlow | .................. | A61B 5/18 340/963 |
| 2012/0327051 A1* | 12/2012 | Davies | ..................... | G09G 5/10 345/207 |

* cited by examiner

*Primary Examiner* — Gregory M Desire
(74) *Attorney, Agent, or Firm* — Baker & Hostetler LLP

(57) ABSTRACT

An instrument panel is identified based on a captured image such as a photograph. A target configuration of the instrument panel is compared with a current configuration of the instrument panel based on the image data. An indication of differences between the target configuration and the current configuration is provided.

20 Claims, 8 Drawing Sheets

VIRTUAL INSTRUMENT VERIFICATION TOOL

BACKGROUND

When preparing an aircraft for takeoff, a number of cockpit procedures must typically be followed. The flight crew generally has to ensure preparation of details necessary for the flight including correct configuration of the instruments and settings, the destination and flight path, the weather, and so on. There are typically a large number of controls and displays inside the cockpit, such as systems that monitor the airplane's electrical, hydraulic, fuel and pressure systems, and a flight management system that manages the flight plan, speed control and navigation details. Various controls and displays also allow the crew to monitor the wind speed and direction, the fuel temperature and flow, cabin and cockpit pressure and temperature, and so on. To ensure safe operations, a number of standard operating procedures must be followed that provide the crew with step-by-step guidance for carrying out their operations.

SUMMARY

Illustrative examples of the present disclosure include, without limitation, a method, device, and computer-readable storage medium. In one aspect, a method for verifying controls and displays pertaining to an aircraft is described. A set of image data representative of at least a portion of an aircraft flight deck is captured. The image data is analyzed to determine a baseline flight deck corresponding to the aircraft flight deck. A target configuration for the aircraft flight deck is determined based on a condition. The target configuration is compared with a current configuration of the aircraft flight deck based on the image data. An indication of differences between the target configuration and the current configuration is provided.

In another aspect, a device configured to verify settings for a control panel is provided. The device may include a processor and memory. Image data representative of at least a portion of the control panel is obtained. The image data is analyzed to determine a baseline panel corresponding to the control panel. A target configuration for the baseline panel is determined based on a condition. The target configuration is compared with a current configuration of the control panel based on the image data. An indication of differences between the target configuration and the current configuration is provided.

In another aspect, a computer-readable storage medium is provided. An instrument panel is identified based on a captured image. A target configuration of the instrument panel is compared with a current configuration of the instrument panel based on the image data. An indication of differences between the target configuration and the current configuration is provided.

Other features of the disclosure are described below. The features, functions, and advantages that have been discussed can be achieved independently in various examples or may be combined in yet other examples, further details of which can be seen with reference to the following description and drawings.

BRIEF DESCRIPTION OF DRAWINGS

Examples of techniques in accordance with the present disclosure are described in detail below with reference to the following illustrations.

DETAILED DESCRIPTION

Figure 1:
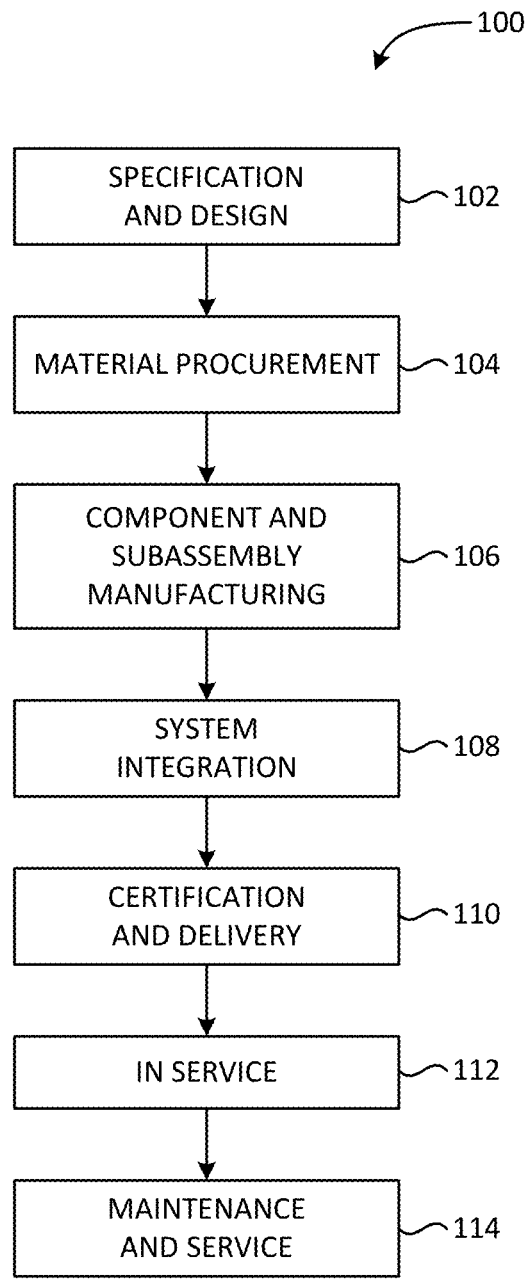
FIG. 1 depicts a flow diagram of an aircraft production and service methodology.
Figure 2:
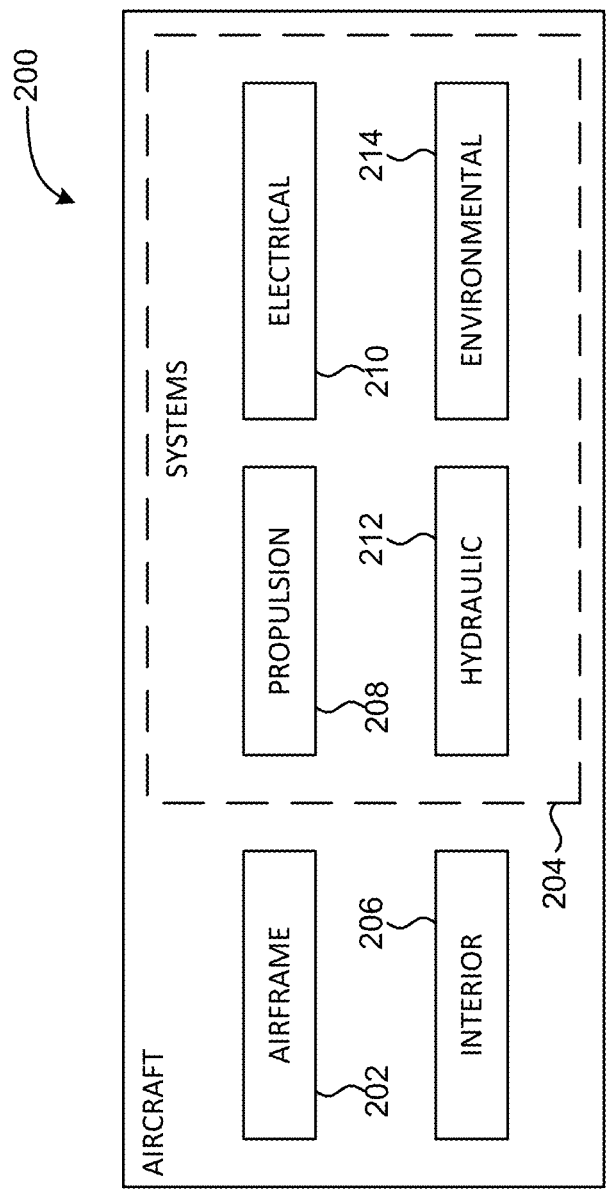
FIG. 2 depicts a block diagram of an aircraft.

Examples provided in this disclosure may be described in the context of aircraft manufacturing and service method 100 as shown in FIG. 1 and an aircraft 200 as shown in FIG. 2. During pre-production, aircraft manufacturing and service method 100 may include specification and design 102 of aircraft 200 and material procurement 104.

During production, component and subassembly manufacturing 106 and system integration 108 of aircraft 200 takes place. Thereafter, aircraft 200 may go through certification and delivery 110 in order to be placed in service 112. While in service by a customer, aircraft 200 is scheduled for routine maintenance and service 114 (which may also include modification, reconfiguration, refurbishment, and so on).

Each of the processes of aircraft manufacturing and service method 100 may be performed or carried out by a system integrator, a third party, and/or an operator (e.g., a customer). For the purposes of this description, a system integrator may include, without limitation, any number of aircraft manufacturers and major-system subcontractors; a third party may include, for example, without limitation, any number of venders, subcontractors, and suppliers; and an operator may be an airline, leasing company, military entity, service organization, and so on.

As shown in FIG. 2, aircraft 200 produced by aircraft manufacturing and service method 100 may include airframe 202 with a plurality of systems 204 and interior 206. Examples of systems 204 include one or more of propulsion system 208, electrical system 210, hydraulic system 212, and environmental system 214. Any number of other systems may be included in this example. Although an aerospace example is shown, the principles of the disclosure may be applied to other industries, such as the automotive industry.

As discussed above, a number of standard operating procedures must be followed that provide the crew with step-by-step guidance for carrying out the procedures. The complexity of the procedures can be significant, and the crew must typically ensure correct configuration of a large number instruments and controls. To avoid errors when stepping through the procedures and checking the settings, it is important to implement a process for verifying that the procedures have been correctly followed. One approach to providing this verification is for the crew to review and look over various paper documents and manuals. Pilots must typically learn cockpit flows that they need perform before proceeding to a checklist. A cockpit flow is an ordering of what needs to be completed in the cockpit. Pilots typically start on one side of the flight deck and work their way to the other side. Pilots may perform this flow in the exact same way every time concerning a specific set up or procedure, which helps the pilots to be efficient and to minimize errors.

It is the pilot's responsibility to configure the aircraft correctly during the cockpit flow and then check that the flow was performed correctly by confirming the flow with the corresponding checklist. Even with this two-step process using flows and checklists, pilots can still miss crucial steps in configuring the aircraft, which can lead to unsafe operations. In some more advanced aircraft, such as the Boeing 777, the aircraft may have the capability to inform the crew if the aircraft is configured correctly. However, in less advanced aircraft, pilot inspection may be the only way to confirm that the aircraft is configured correctly.

In various implementations described herein, the disclosure describes a virtual instrument verification tool that utilizes imaging technologies to verify correct configuration of an instrument panel. In some implementations, a tablet or other mobile device may be used. In one example, a pilot or other crew member can take one or more photos of the cockpit. Based on the captured photo(s), an application may be executed that is configured to identify and determine if the dials and switches of the cockpit are in their correct settings per a particular procedure or checklist. In particular, the application may determine if the dials and switches are in the correct position based on the task or action that the pilot is performing.

The virtual instrument verification tool can thus be useful for preventing the possibility of missing a flight critical step in a pilot's flow or checklist item by allowing an application executing on a computing device to review and confirm the correct settings for dials and switches within a cockpit. In many cases, inspection by the pilots/crew is the only way to confirm procedures that use checklists, and the use of the virtual instrument verification tool can provide more consistent and reliable verification, leading to fewer issues and safer operations.

In some implementations, the virtual instrument verification tool may be used in conjunction with an airplane installed imaging device, such as a camera installed in the cockpit. In other implementations, the virtual instrument verification tool may be implemented using imaging capabilities integrated into a tablet, smartphone, or other mobile device. Any type of imaging device may be used to capture an image of the cockpit or a portion thereof, and using the captured image, the virtual instrument verification tool may be used to determine correct settings of the dials and switches of the cockpit.

Figure 3:
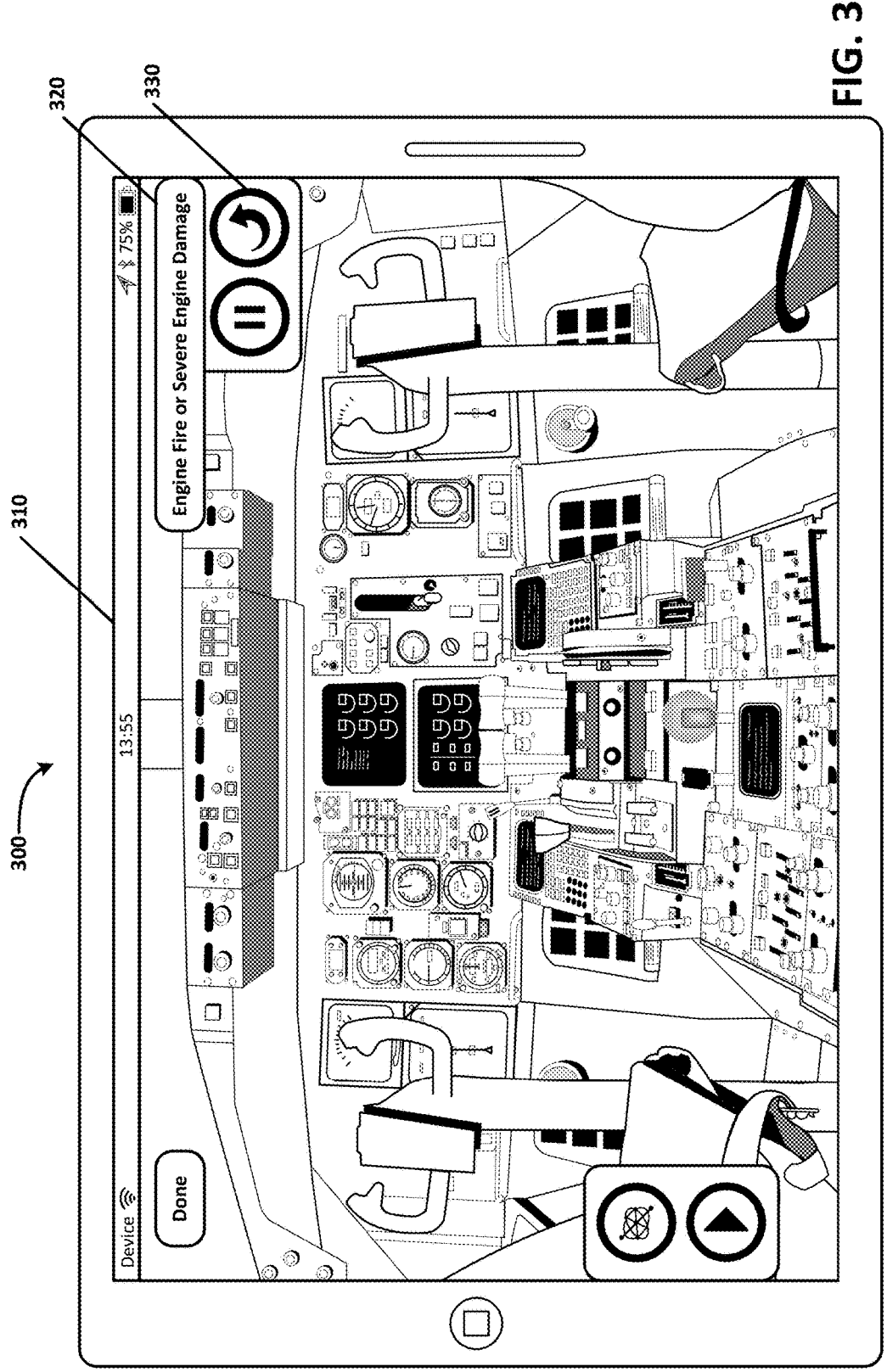
FIG. 3 depicts an example user interface that may be used in conjunction with a virtual instrument verification tool.

FIG. 3 illustrates an example device 300 implementing a virtual instrument verification tool in accordance with this disclosure. Device 300 may include a window 310 shown as rendering a captured image of a cockpit showing various controls and displays. In the example shown, the image includes an indication of a selected procedure 320, which in some implementations may also include additional controls 330 to allow the user to select options such as "continue" or "go back."

The virtual instrument verification tool may use image recognition techniques to recognize the controls depicted in the image and correlate the captured image to a known configuration for the particular cockpit. In one example, the cockpit can be identified via a user input identifying a particular airplane model or tail number. In another example, the virtual instrument verification tool may use recognition techniques to match the captured cockpit image to a database of known cockpit configurations. Once the cockpit is identified, the virtual instrument verification tool can determine if any of the switches or dials are in the wrong position. In some implementations, the virtual instrument verification tool can provide a warning on the screen when a switch or dial is in the wrong position, and also provide an indication when the switch or dial is in the correct position. The warnings and confirmations can also be provided using audio or other feedback mechanisms.

Figure 4:
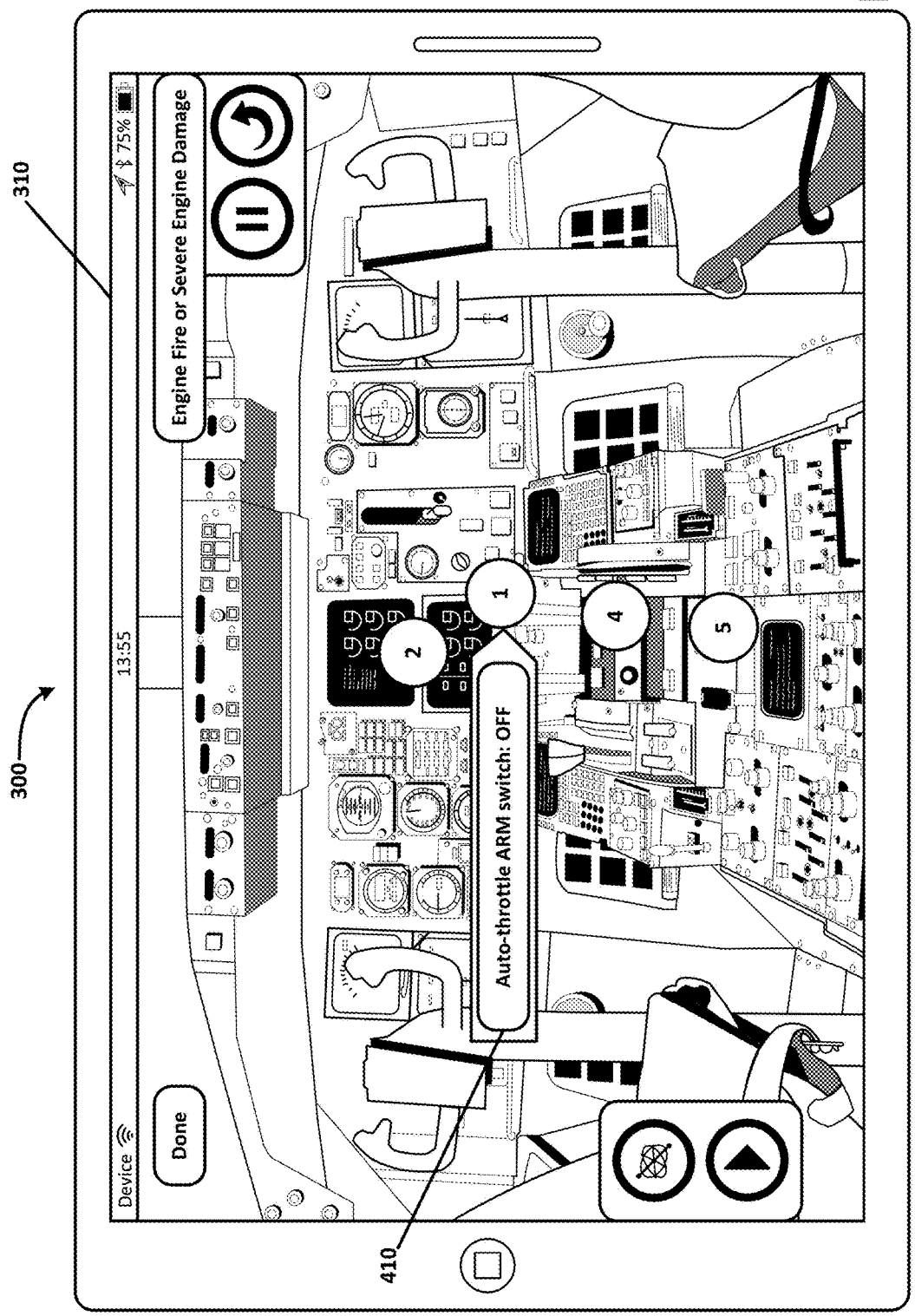
FIG. 4 depicts an example user interface that may be used in conjunction with a virtual instrument verification tool.

FIG. 4 illustrates the example device 300 implementing a virtual instrument verification tool in accordance with this disclosure. Device 300 may include window 310 shown rendering the captured image of a cockpit with indication of selected procedure 320. After performing a verification of the switches and dials, the virtual instrument verification tool may present additional information to the user. For example, the virtual instrument verification tool may provide checklist indications 410 that in some implementations may indicate to the user checklist items that need to be corrected. In other implementations, the virtual instrument verification tool may step through all the checklist items to verify correct configuration of the switches and dials. The virtual instrument verification tool may be used after completion of a procedure or checklist to verify correct settings. The virtual instrument verification tool may also be used to perform the verification during intermediate points in the procedure.

By performing the additional verification using the virtual instrument verification tool, the pilot or crew may determine if initial conditions and settings are correct at the start of an aircraft procedure, or at other times during the aircraft procedure as desired. The use of a tablet computer or other mobile device to check initial conditions and settings provides a convenient and effective way to assure that flight procedures or checklists have been properly implemented.

As described above, a cockpit or a portion of the cockpit may be viewed and captured by an imaging device such as a mounted camera or a camera on a mobile device. In some implementations, the captured image may be associated with a set of coordinates and aligned accordingly. The virtual instrument verification tool may further perform a perspective projection of the image onto an image plane. A virtual cockpit image may be modeled in its own object reference frame and generated.

As noted, the systems described herein are provided as examples and a variety of devices and system configurations may be used to implement the disclosed systems and methods.

In order to accurately match a captured image of a cockpit with a reference cockpit, a database of candidate cockpits may be stored and made available for use by the virtual instrument verification tool. In order to match the captured image with the candidate cockpits, the virtual instrument verification tool may determine where the image capture device is located in reference to the cockpit. In one implementation, the point of view of the image capture device may be tracked, for example by using a tracking system to determine the location of the capture device. For example, the Global Positioning System (GPS) may be used to provide a location of the image capture device.

Additionally, the virtual instrument verification tool may be configured to recognize one or more items within the captured image. Object recognition may include processes for finding and recognizing a given object in an image. The image may first be processed to reduce noise or to convert multiple shades of gray to a combination of black and white. Following such initial processes, the system may count, measure, and/or identify objects, dimensions, defects, or other features in the image. A number of image processing techniques may be used such as pixel counting, thresholding, segmentation, inspecting an image for discrete groups of connected pixels as image recognition points, edge detection, template matching, and other techniques. The virtual instrument verification tool system may use a combination of these techniques to perform an image recognition process.

For an object in an image such as a switch or dial, there are a plurality of features on the object that can be extracted to provide a feature description of the object. Such feature descriptors for an image can then be used to identify the object when attempting to locate the object in an image containing other objects. An image recognition algorithm may be used to extract feature descriptors and match the extracted features to recognize the image. Such an algorithm may include features to be robust to changes in image scale and noise.

A feature descriptor may be a distillation of a portion of an image to a set of definition data that can be referenced for identification purposes. Image areas for objects that may be referenced as the basis of descriptive features may be used for identification purposes. Those skilled in the art will recognize that a specific definition of a feature descriptor will depend on the particular application and algorithm, and all such definitions are contemplated as within the scope of the present disclosure.

Various methods known to those skilled in the art may be used to implement forms of feature descriptors. For example, occurrences of gradient orientation in localized portions of an image may be counted. Alternatively and optionally, edge detection algorithms may be used to identify points in an image at which the image brightness changes sharply or has discontinuities.

In an embodiment, feature descriptors may be used such that image detection may be based on the appearance of the object at particular interest points, and may be invariant to image scale and rotation. The descriptors may be implemented so as to be impervious to changes in illumination, noise, and minor changes in viewpoint. In addition, the descriptors may be implemented to be easy to match against a database of feature descriptors with a low probability of mismatch. In some implementations, object recognition may be performed in real time or near real time.

Once identified, feature descriptors may act as reference points against which other objects can be related or against which objects can be measured. The recognition of feature descriptors in images may act as a reference for image scaling, or may allow the image and a corresponding physical object to be correlated. By identifying feature descriptors at known locations in an image, the relative scale in the produced image may be determined by comparison of the locations of the known locations in the image and corresponding panel. The virtual instrument verification tool may also perform recognition by examining and processing individual pixels of an image and determining feature properties. Such analysis may further use knowledge databases and applications such as pattern recognition engines.

As discussed, the virtual instrument verification tool system may include or use one or more image capture devices such as a digital or analog camera with suitable optics for acquiring images, a camera interface for digitizing images, input/output hardware or communication link, and a program for processing images and detecting features of the image. The virtual instrument verification tool system may be implemented using a variety of devices and configurations. The virtual instrument verification tool system may also be integrated with one or more other devices that are capable of performing other activities beyond implementing the virtual instrument verification tool system. Such devices may include a personal data assistant (PDA), a mobile telephone or smart phone, a laptop or desktop computer, a tablet, virtual reality goggles or eyewear, or any other device capable of implementing a virtual instrument verification tool system. All such configurations and devices are contemplated as within the scope of the present disclosure.

While various devices implementing a virtual instrument verification tool system have been described in examples as having a single unit housing all the described components, the components and devices used in a virtual instrument verification tool may be physically separate. For example, the user interface may be physically separate from the image capture device and located in separate housings. Moreover, other components, such as processors, memory, storage devices, etc. may be located in one or more physically distinct devices or components. Such devices or components may communicate with each other using communications technologies known in the art, including wired and wireless communications technologies. Furthermore, the image capture device may be a stereo setup (e.g., two cameras) which may allow for stereo rendering of the cockpit.

As mentioned, in some implementations all of the functions may reside in a user device such as a portable camera or a tablet. In other implementations, the image may be captured by a user device with a suitable image capture device and transmitted over a network to another system that may provide, for example, an image processing service for image recognition and analysis. Furthermore, because of the limited processing and available memory on mobile devices, it may be advantageous for the device to transmit one or more captured images via an accessible data network to a system available via the network. For example, a server may provide image analysis and recognition services for image data transmitted by the mobile device. The server may also access a database storing various cockpit and instrument data that may be transmitted to the mobile device. Furthermore, the server, in addition to maintaining a database storing cockpit and instrument data, may also maintain a database storing detailed checklist and procedure information for recognized cockpits and instruments.

The mobile device may include a location determination function, such as GPS or cellular based location determination. In an embodiment, the location determination performed by the device may be transmitted to a server. The device's location may be determined hierarchically, for example beginning with a coarse location estimate and refining the initial estimate to arrive at a more precise estimate.

Once a device's location and orientation or point of view is determined, any number of services may be provided related to the location and orientation. For example, the particular aircraft where the device is located can be determined and the virtual instrument verification tool may access flight information specific to the aircraft to check additional cockpit configuration data. As another example, the virtual instrument verification tool may retrieve weather data for the location and determine if weather-related procedures (e.g., anti-icing) should be implemented.

Additionally, real-time or near real-time queries may be generated or prompted upon direct input from the user. In one implementation, when a user clicks on a portion of a rendered image on the mobile device, the virtual instrument verification tool may interpret the user click as a request for additional information about the item represented by the selected portion of the rendered image. For example, the user may click on the portion of the image in which a particular panel is rendered. Such navigable areas may be rendered similar to a web page on a browser. In other embodiments, the user input may represent a push/pull for information regarding the area associated with the user input. Rendering of the received information from the database may be performed through a variety of methods such as a 2D overlay, 3D augmented reality, playback of a particular sound, and the like.

In some embodiments, the image data captured by the device may be transmitted to the server for analysis and response. In other embodiments, the device may extract feature descriptors from captured images and transmit the extracted descriptors to the server. The device may, for example, comprise hardware and/or software for image processing and feature descriptor recognition and extraction, and thus save significant bandwidth in transmitting image data on the network.

In some implementations, metadata and/or context specific actions may also be delivered to a device. In one embodiment, a device may receive a request to provide the database with a particular piece of information when a particular cockpit or instrument is determined to be in view. For example, during the context of an emergency procedure, additional information related to the particular emergency may be requested when triggered by a particular warning indication that comes into view.

In some embodiments, the database may comprise predetermined data such as feature descriptors and metadata associated with one or more cockpits or instruments. The predetermined data may be provided by the service provider for the virtual instrument verification tool. Additionally and optionally, the data may be user defined and provided by users. For example, cockpits that are not represented by pre-populated data in the database may be represented by images provided by users. When a pattern fails to be recognized by the image recognition processes, it may be determined that the pattern represents a new cockpit or instrument and the user transmitted image may be used to represent the new cockpit or instrument.

In an embodiment, metadata such as device location may be automatically and seamlessly transmitted by the user device to supplement the newly added cockpit or instrument. Additionally and optionally, users may be prompted to provide additional information that can be associated with the newly created entry.

Furthermore, users may provide additional context sensitive metadata associated with a particular cockpit or instrument. For example, a cockpit or instrument may contain different sets of metadata that may be dependent upon the user's context (an image may initiate accessing different metadata when captured during pre-flight, as compared to when captured during flight).

Figure 5:
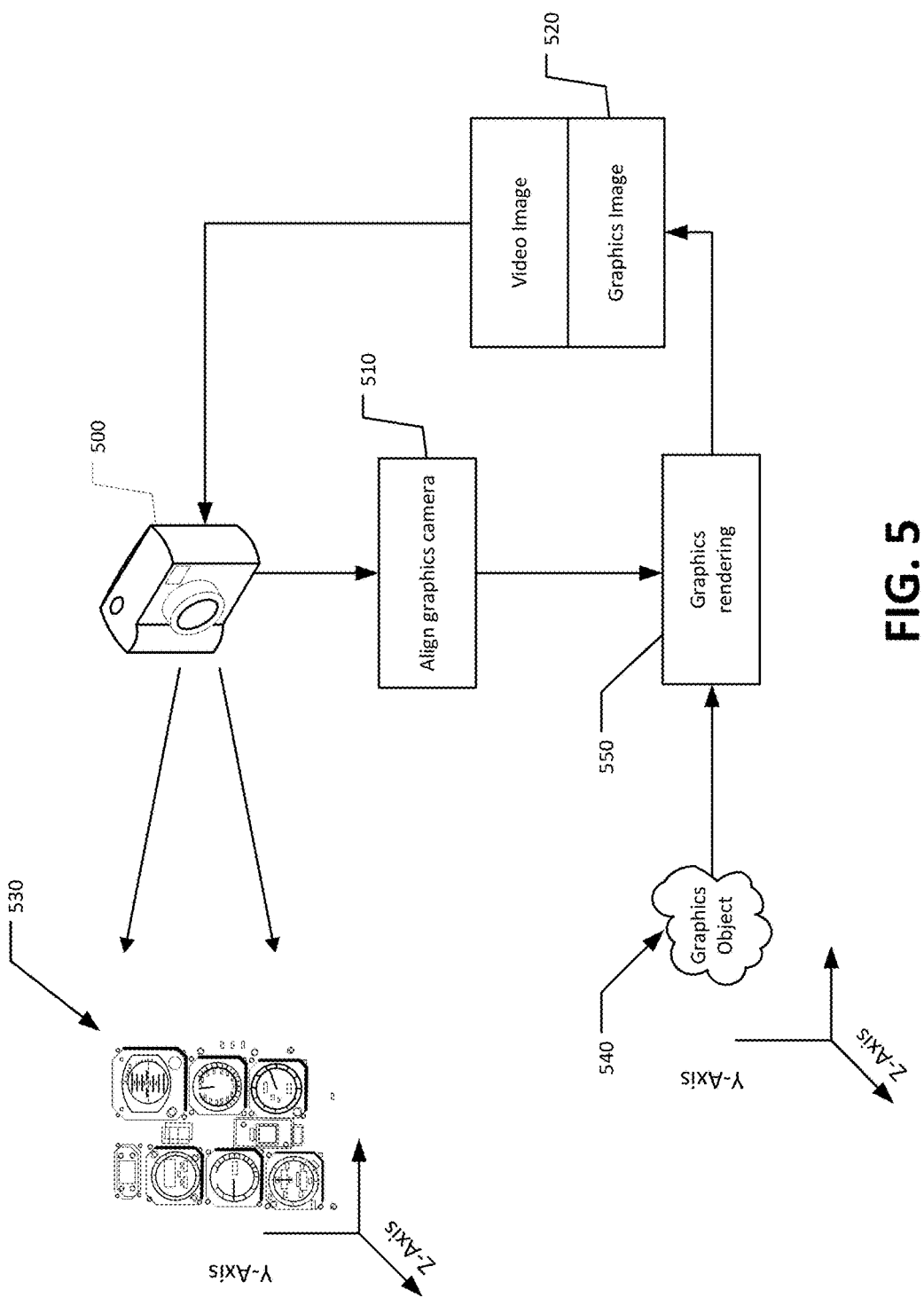
FIG. 5 depicts an example system that may be used in conjunction with a virtual instrument verification tool.

Referring to FIG. 5, an instrument panel 530 may be viewed and captured by an imaging device such as a camera 500. The instrument panel 530 may be associated with a set of coordinates and aligned 510 accordingly. The camera 500 may further perform a perspective projection of the 3D image onto a 2D image plane. The generation of a combined image 520 with the captured image along with additional graphics objects 540 indicating discrepancies between the settings on the instrument panel and settings in accordance with a baseline configuration may be performed with a standard computer graphics system implementing a graphics rendering function 550. The graphics object 540 may be modeled in its own object reference frame. The graphics rendering function 550 may further use information about the imaging of the instrument panel so that the graphics objects can correctly rendered. This data may be used, for example, as input to a synthetic camera for generating the image of the graphics objects. The generated image of the graphics objects may then be merged with the image of the instrument panel to form the combined image 520.

Figure 6:
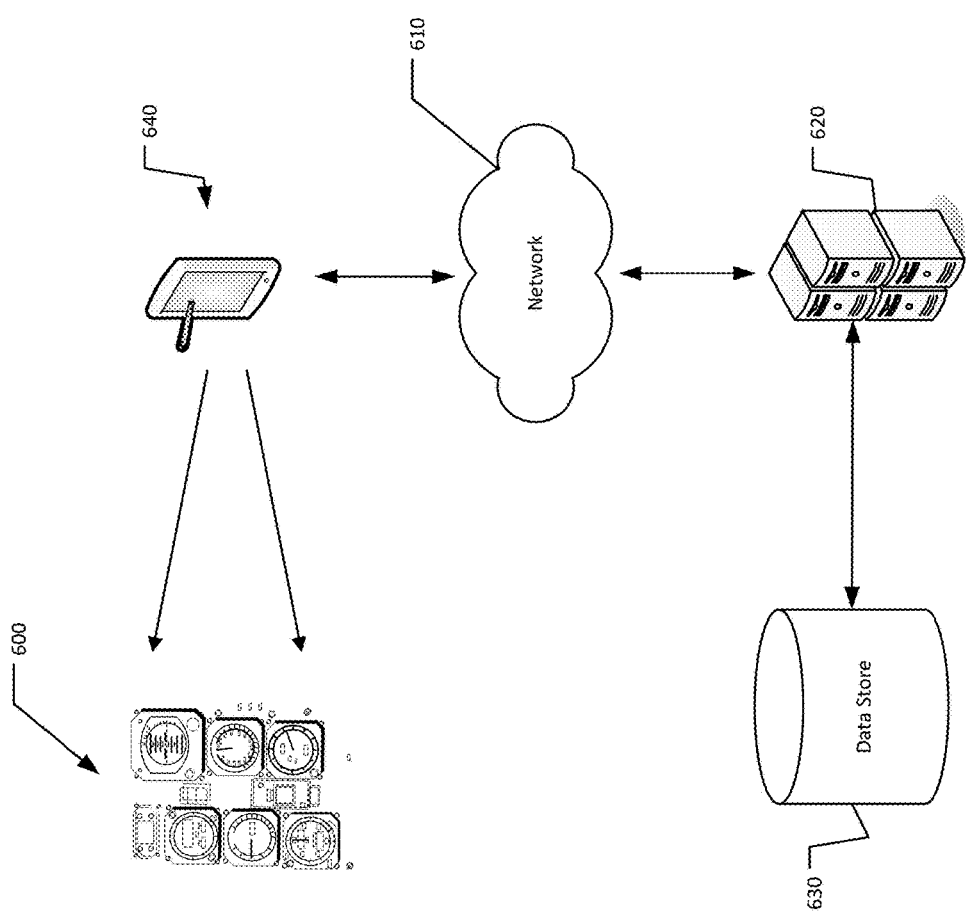
FIG. 6 illustrates an example system that may be used in conjunction with a virtual instrument verification tool.

In one example implementation illustrated in FIG. 6, a device 640 with an image capture capability may capture an image of a cockpit or instrument 600. The captured image file may be transmitted via a network 610 to system 620 that may comprise one or more servers hosting at least one application that receives the transmitted image and analyzes the image to extract feature descriptors. Device 640 may further include a location determination capability using GPS or other location determination means, and may transmit the location information along with the image data. System 620 may further have access to data store 630 that may comprise a database of predetermined cockpits or instruments associated with a number of feature descriptors. System 620 may query the data store 630 for a matching cockpit or instrument based on the feature descriptors extracted from the image transmitted by device 640. If a match is found, data store 630 may further return metadata associated with a matched cockpit or instrument. System 630 may then transmitted the returned metadata to device 640 via network 610, whereupon the device 640 may render the received metadata and/or merge the received metadata with a currently rendered image.

Those skilled in the art will readily recognize that each particular processing component may be distributed and executed by the user device and servers and other components in the network. For example, metadata extraction and cockpit or instrument recognition can be handled by the device or by the server.

Figure 7:
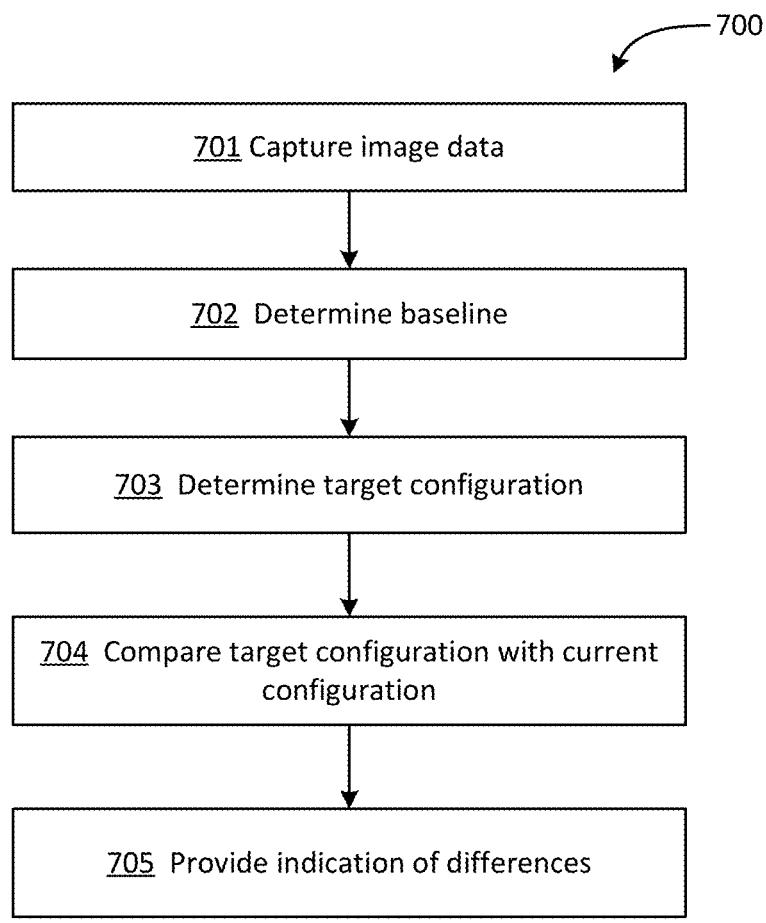
FIG. 7 depicts an example procedure for verifying controls and displays in accordance with this disclosure.

FIG. 7 illustrates an example operational procedure 700 for verifying controls and displays. Referring to FIG. 7, operation 701 illustrates capturing at least one set of image data representative of at least a portion of an aircraft flight deck. The image data may be captured using an imaging device installed on a mobile computing device. Alternatively, the image data may be captured using a flight deck mounted imaging device. Operation 701 may be followed by operation 702. Operation 702 illustrates causing analysis of the image data to determine a baseline flight deck corresponding to the aircraft flight deck. In some implementations, the baseline flight deck may be determined as a function of a descriptor determined from the image data.

Operation 702 may be followed by operation 703. Operation 703 illustrates determining a target configuration for the aircraft flight deck based on at least one condition. The target configuration may include initial condition settings for a flight deck procedure. In some implementations, the target configuration may be integrated with an automated electronic checklist. The condition may include an indication of a flight deck operational scenario. The condition may also be based on a context of the aircraft flight deck. For example, the context may be indicative of an environmental or operational condition associated with the aircraft flight deck.

Operation 703 may be followed by operation 704. Operation 704 illustrates comparing the target configuration with a current configuration of the aircraft flight deck based on the image data. Operation 704 may be followed by operation 705. Operation 705 illustrates providing an indication of differences between the target configuration and the current configuration. The indication may include a rendering of the aircraft flight deck and an overlay indicative of the differences.

The various examples used in this disclosure are described in the context of a aircraft flight operation, but it should be understood that the described principles may be applied to any operational scenario where verification of a panel or display is desired. Such examples in the field of transportation include airline, train, and cruise ship operations. The described principles may also be implemented in other fields such as space launch, nuclear power operations, etc.

Figure 8:
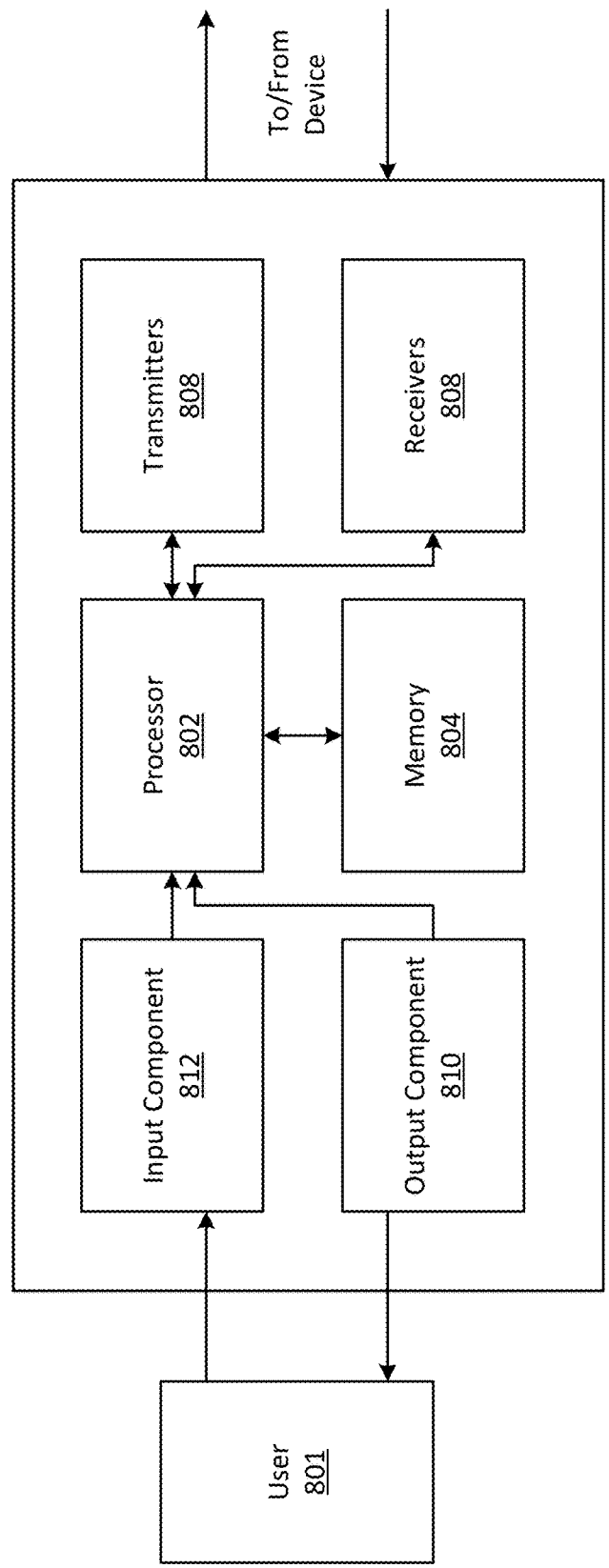
FIG. 8 is a diagram illustrating an example computing system that may be used in some embodiments.

FIG. 8 is an example schematic diagram of a user device that may be used in conjunction with a virtual instrument verification tool. In one example, a user device may include a processor 802, a memory device 804 coupled to processor 802, one or more transmitters 806, one or more receivers 808, an output component 810, and an input component 812.

Processor 802 includes any suitable programmable circuit including one or more systems and microcontrollers, microprocessors, reduced instruction set circuits (RISC), application specific integrated circuits (ASIC), programmable logic circuits (PLC), field programmable gate arrays (FPGA), and any other circuit capable of executing the functions described herein. The above examples are not intended to limit in any way the definition and/or meaning of the term "processor."

Memory device 804 includes a non-transitory computer-readable storage medium, such as, without limitation, random access memory (RAM), flash memory, a hard disk drive, a solid state drive, a diskette, a flash drive, a compact disc, a digital video disc, and/or any suitable memory. In the exemplary implementation, memory device 804 includes data and/or instructions embodying aspects of the disclosure that are executable by processor 802 (e.g., processor 802 may be programmed by the instructions) to enable processor 802 to perform the functions described herein. Additionally, the memory device 804 may comprise an operation system and applications.

Transmitters 806 are configured to transmit control signals and data signals over a network. In one example, transmitters 806 may be wireless and transmit in a radio frequency spectrum and operate using an appropriate communication protocol.

Receivers 808 are configured to receive control signals and data signals over network. In one example, receivers 808 may be wireless and receive signals on a radio frequency spectrum using an appropriate communication pro.

The node may also include at least one output component 810 for presenting information to a user 801. Output component 810 may be any component capable of conveying information to user 801. In some implementations, output component 810 includes an output adapter, such as a video adapter and/or an audio adapter or the like. An output adapter is operatively coupled to processor 802 and is configured to be operatively coupled to an output device, such as a display device (e.g., a liquid crystal display (LCD), organic light emitting diode (OLED) display, cathode ray tube (CRT), "electronic ink" display, or the like) or an audio output device (e.g., a speaker, headphones, or the like). In some implementations, at least one such display device and/or audio device is included with output component 810.

The node may also include at least one input component 812 for receiving input from user 801. Input component 812 may include, for example, a keyboard, a pointing device, a mouse, a stylus, a touch sensitive panel (e.g., a touch pad or a touch screen), a gyroscope, an accelerometer, a position detector, an audio input device, or the like. A single component, such as a touch screen, may function as both an output device of output component 810 and input component 812. In some implementations, output component 810 and/or input component 812 include an adapter for communicating data and/or instructions between the node and a computer connected thereto.

It will be appreciated that, while various items are illustrated as being stored in memory or on storage while being used, these items or portions of them may be transferred between memory and other storage devices. Alternatively, in other examples some or all of the software modules and/or systems may execute in memory on another device and communicate with the illustrated computing systems via inter-computer communication. In some examples, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other examples. Accordingly, the present invention may be practiced with other computer system configurations.

In some examples, a system memory may be used, which is one example of a computer-readable storage medium configured to store program instructions and data as described above for FIGS. 1-8 for implementing examples of the corresponding methods and apparatus. However, in other examples, program instructions and/or data may be received, sent, or stored upon different types of computer-accessible media. Generally speaking, a computer-readable storage medium may include non-transitory and tangible storage media or memory media such as magnetic or optical media, e.g., disk or DVD/CD coupled to a computer system or gateway device. A computer-readable storage medium may also include any volatile or non-volatile media such as RAM (e.g., SDRAM, DDR SDRAM, RDRAM, SRAM, etc.), ROM, etc., that may be included in some examples of the computer systems described above as system memory, gateway device, or another type of memory. Portions or all of the multiple computer systems, such as those illustrated herein, may be used to implement the described functionality in various examples; for example, software components running on a variety of different devices and servers may collaborate to provide the functionality.

It will be appreciated that in some examples the functionality provided by the routines discussed above may be provided in alternative ways, such as being split among more routines or consolidated into fewer routines. Similarly, in some examples, illustrated routines may provide more or less functionality than is described, such as when other illustrated routines instead lack or include such functionality respectively or when the amount of functionality that is provided is altered. In addition, while various operations may be illustrated as being performed in a particular manner (e.g., in serial or in parallel) and/or in a particular order, in other examples the operations may be performed in other orders and in other manners. Similarly, the data structures discussed above may be structured in different ways in other examples, such as by having a single data structure split into multiple data structures or by having multiple data structures consolidated into a single data structure, and may store more or less information than is described (e.g., when other illustrated data structures instead lack or include such information respectively or when the amount or types of information that is stored is altered).

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

In general, the various features and processes described above may be used independently of one another, or may be combined in different ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. The example systems and components described herein may be configured differently than described. For example, elements may be added to, removed from, or rearranged compared to the disclosed examples.

While certain example or illustrative examples have been described, these examples have been presented by way of example only, and are not intended to limit the scope of the inventions disclosed herein. Indeed, the novel methods and systems described herein may be embodied in a variety of other forms. The accompanying claims and their equivalents are intended to cover such forms or modifications as would fall within the scope and spirit of certain of the inventions disclosed herein.

The invention claimed is:

1. A method for verifying controls and displays, the method comprising:
   capturing at least one set of image data representative of at least a portion of an aircraft flight deck;
   causing analysis of the image data to determine a baseline flight deck corresponding to the aircraft flight deck;
   determining a target configuration for the aircraft flight deck based on at least one condition;
   comparing the target configuration with a current configuration of the aircraft flight deck based on the image data and a selected procedure or checklist for the target configuration; and
   providing an indication of differences between the target configuration and the current configuration.

2. The method of claim 1, wherein said baseline flight deck is determined as a function of at least one feature descriptor determined from said image data.

3. The method of claim 1, wherein said target configuration includes initial condition settings for a flight deck procedure.

4. The method of claim 1, wherein said image data is captured using an imaging device installed on a mobile computing device.

5. The method of claim 1, wherein said target configuration is integrated with an automated electronic checklist.

6. The method of claim 1, wherein said condition comprises an indication of a flight deck operational scenario.

7. The method of claim 1, further comprising sending the image data over a communication network to a server, wherein said analysis is performed by the server.

8. The method of claim 1, further comprising determining a geographic location associated with the aircraft flight deck, wherein said condition is based at least in part on the geographic location.

9. The method of claim 1, wherein the image data is captured using a flight deck mounted imaging device.

10. The method of claim 1, wherein the indication comprises a rendering of the aircraft flight deck and an overlay indicative of the differences.

11. The method of claim 1, wherein the baseline flight deck is configured based on user data.

12. The method of claim 1, further comprising determining feature descriptors in the image data to recognize physical features of the aircraft flight deck.

13. The method of claim 1, wherein the condition is based on a context of the aircraft flight deck.

14. The method of claim 13, wherein the context is indicative of an environmental or operational condition associated with the aircraft flight deck.

15. A computing device configured to verify settings for a control panel, the device comprising at least a processor and memory, the memory having stored thereon computer executable instructions that, when executed by the at least one processor, cause the device to at least:
   obtain image data representative of at least a portion of the control panel;
   analyze the image data to determine a baseline panel corresponding to the control panel;
   determine a target configuration for the baseline panel based on a condition and a selected procedure or checklist for the target configuration;
   compare the target configuration with a current configuration of the control panel based on the image data; and
   provide an indication of differences between the target configuration and the current configuration.

16. The device of claim 15, wherein the image data is analyzed to identify feature descriptors and effectuate a recognition of the baseline panel.

17. The device of claim 16, wherein the indication of differences is provided by rendering a visual indication of the differences on a display device.

18. A non-transitory computer-readable medium having computer-readable instructions stored thereon, the computer-readable instructions comprising instructions that upon execution on a computing system, at least cause:

identifying an instrument panel based on a captured image;

comparing a target configuration of the instrument panel with a current configuration of the instrument panel based on the captured image and a selected procedure or checklist for the target configuration; and providing an indication of differences between the target configuration and the current configuration.

19. The non-transitory computer-readable medium of claim 18, wherein captured image is analyzed to allow image recognition of the instrument panel.

20. The non-transitory computer-readable medium of claim 18, wherein the target configuration is determined based on at least one of a user input and an indication of a condition.

* * * * *